US008136466B2

(12) United States Patent
Farber

(10) Patent No.: US 8,136,466 B2
(45) Date of Patent: Mar. 20, 2012

(54) SELF-BAILING WATERCRAFT VALVE

(75) Inventor: Robert Farber, Montreal (CA)

(73) Assignee: GSC Technologies Corporation, St. Jean, Quebec (CA)

( * ) Notice: Subject to any disclaimer, the term of this patent is extended or adjusted under 35 U.S.C. 154(b) by 244 days.

(21) Appl. No.: 12/545,655

(22) Filed: Aug. 21, 2009

(65) Prior Publication Data

US 2011/0041750 A1 Feb. 24, 2011

(51) Int. Cl.
*B63B 13/00* (2006.01)
(52) U.S. Cl. .................. 114/197; 114/183 R
(58) Field of Classification Search .......... 114/183 R, 114/197, 198, 183 A, 185
See application file for complete search history.

(56) References Cited

U.S. PATENT DOCUMENTS

| | | | |
|---|---|---|---|
| 275,270 A * | 4/1883 | Renton | 114/197 |
| 277,102 A * | 5/1883 | Baker | 114/197 |
| 847,112 A * | 3/1907 | Renton | 114/197 |
| 936,312 A * | 10/1909 | Danford | 114/197 |
| 2,184,897 A * | 12/1939 | Phillips, Jr. | 114/183 R |
| 2,476,434 A * | 7/1949 | Spang | 137/433 |
| 2,772,648 A * | 12/1956 | De Persia | 114/185 |
| 2,800,912 A * | 7/1957 | McCamish et al. | 137/68.23 |
| 2,919,670 A * | 1/1960 | Clark, Jr. et al. | 114/185 |
| 2,929,347 A * | 3/1960 | Veltman | 114/183 R |
| 2,949,879 A * | 8/1960 | Kehn | 114/185 |
| 2,969,761 A * | 1/1961 | Youtie | 114/183 A |
| 3,394,671 A * | 7/1968 | Mayer | 114/183 R |
| 3,459,150 A * | 8/1969 | Lunde, Jr. | 114/183 R |
| 3,565,031 A * | 2/1971 | DePersia et al. | 114/185 |
| 3,797,442 A * | 3/1974 | McRae | 114/197 |
| 3,903,918 A * | 9/1975 | Carnarius | 137/433 |
| 4,217,846 A * | 8/1980 | Wight | 114/185 |
| 4,846,218 A * | 7/1989 | Upchurch | 137/544 |
| 4,901,754 A * | 2/1990 | Sable et al. | 137/433 |
| 5,346,369 A * | 9/1994 | Miller, Jr. | 417/211 |
| 5,522,338 A * | 6/1996 | Eilert et al. | 114/345 |
| 5,662,138 A * | 9/1997 | Wang | 137/433 |
| 5,671,906 A * | 9/1997 | Rosen | 251/148 |
| 5,989,081 A * | 11/1999 | Lekhtman | 440/27 |
| 6,131,605 A * | 10/2000 | Kothe et al. | 137/423 |
| 6,164,237 A * | 12/2000 | Coryell et al. | 114/345 |
| 6,237,639 B1 * | 5/2001 | Jougla et al. | 137/899.2 |
| 6,357,376 B1 * | 3/2002 | Purio | 114/197 |
| 6,615,760 B1 * | 9/2003 | Wise et al. | 114/197 |
| 6,634,312 B2 * | 10/2003 | Warner et al. | 114/197 |
| 6,736,081 B1 * | 5/2004 | Green et al. | 114/183 R |
| 7,121,526 B2 * | 10/2006 | Alvarez | 251/215 |
| 7,341,015 B2 * | 3/2008 | Bourret et al. | 114/183 R |
| 7,434,528 B1 * | 10/2008 | McKibben | 114/197 |

(Continued)

*Primary Examiner* — Lars A Olson
*Assistant Examiner* — Andrew Polay
(74) *Attorney, Agent, or Firm* — Husch Blackwell LLP

(57) ABSTRACT

A valve for use in combination with a self-bailing hole of a watercraft includes a flange, a skirt, a valve member, a retention member, and a base member. The flange has a central aperture opening into a hollow interior of the skirt. The hollow interior contains the valve member, which is movable between a sealed configuration preventing fluid flow through the valve and an unsealed configuration allowing fluid flow through the valve. One end of the skirt is secured to the flange, while the other end of the skirt has an opening larger than the central aperture of the flange. The retention member prevents the valve member from exiting the hollow interior of the skirt in the unsealed configuration, while the base member is used to secure the valve within the self-bailing hole of the watercraft.

18 Claims, 2 Drawing Sheets

U.S. PATENT DOCUMENTS

| | | | |
|---|---|---|---|
| 7,530,370 B2* | 5/2009 | Gross | 137/899.2 |
| 7,699,013 B1* | 4/2010 | Kreisel | 114/197 |
| 2002/0069811 A1* | 6/2002 | Warner et al. | 114/360 |
| 2007/0095268 A1* | 5/2007 | Bourret et al. | 114/183 R |
| 2007/0163480 A1* | 7/2007 | Cotton | 114/197 |
| 2009/0050043 A1* | 2/2009 | Alvarez | 114/197 |
| 2010/0193722 A1* | 8/2010 | Jervis | 251/315.1 |
| 2010/0263745 A1* | 10/2010 | Symes | 137/528 |

* cited by examiner

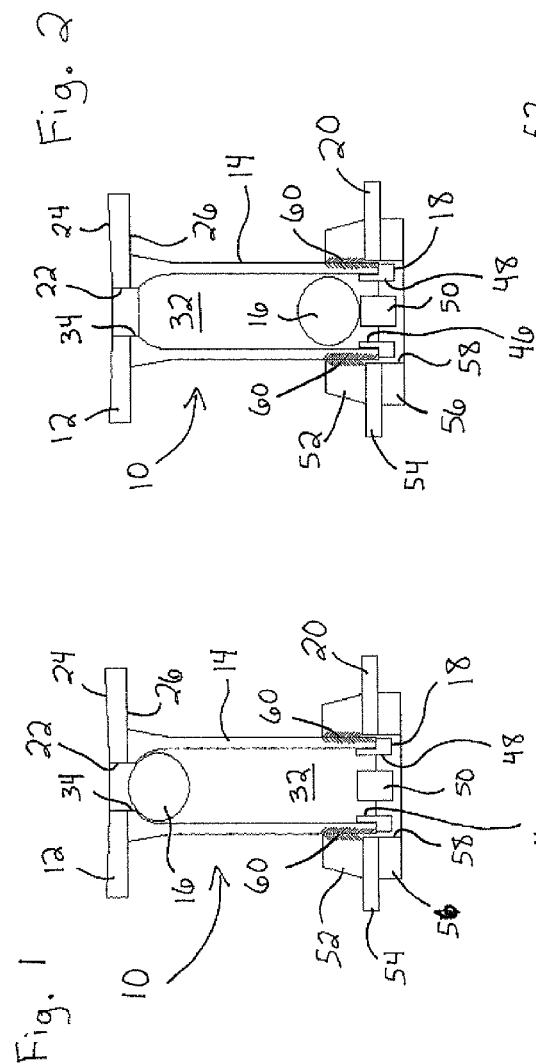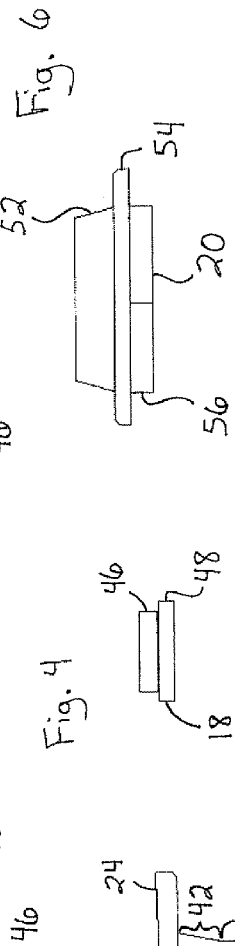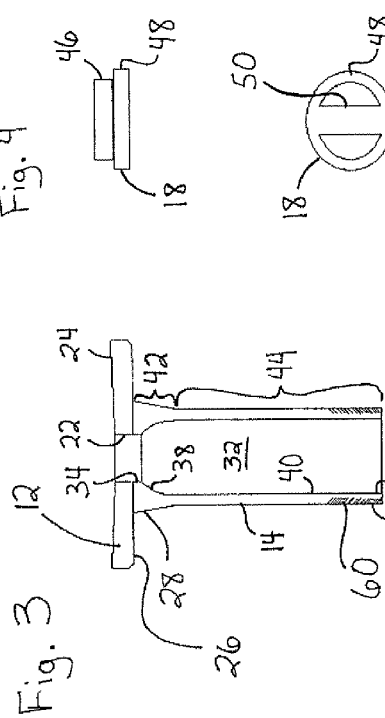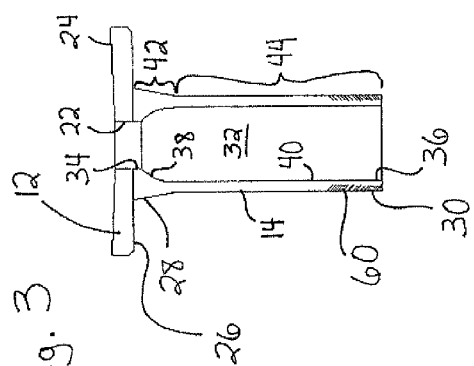

SELF-BAILING WATERCRAFT VALVE

BACKGROUND

1. Field of the Disclosure

This disclosure generally relates to a valve assembly for automatically draining water from a watercraft.

2. Description of Related Art

From time to time, water can accumulate in the bottom of a watercraft. This may occur for any of a number of reasons, including hull leakage, water splashing into the watercraft during normal use, and rainwater falling into the watercraft either during use or storage.

In response to this problem, many watercrafts are provided with a self-bailing feature. The self-bailing feature may be implemented in a number of ways, but in one example, a portion of the watercraft (e.g., the transom or bottom) is provided with a hole or aperture commonly referred to as a self-bailing hole. The self-bailing hole is provided with valving means for allowing water to drain from the interior of the watercraft, while also preventing watering from entering the watercraft interior therethrough. Exemplary valving means are described in U.S. Pat. No. 2,772,648 to De Persia; U.S. Pat. No. 3,394,671 to Mayer; U.S. Pat. No. 4,217,846 to Wight; and U.S. Pat. No. 7,434,528 to McKibben.

A general aspect or object of the present invention is to provide an improved valve for use in combination with the self-bailing hole of a watercraft.

Another general aspect or object of the present invention is to provide an improved method for controlling fluid flow through a self-bailing hole of a watercraft.

Other aspects, objects and advantages of the present invention, including the various features used in various combinations, will be understood from the following description according to illustrative embodiments of the present invention, taken in conjunction with the drawings in which certain specific features are shown.

SUMMARY

According to one aspect of the present invention, a valve is provided for use in combination with a substantially vertical self-bailing hole of a watercraft. The valve comprises a flange configured to be secured to the bottom surface of the watercraft on the inside of the watercraft. The flange has an upper face, a lower face, and a central aperture extending between the upper and lower faces. A skirt of the valve is configured to be at least partially received within the self-bailing hole of the watercraft and extending between a free end and a fixed end to define a hollow interior. The fixed end of the skirt is secured to the lower face of the flange and the central aperture of the flange opens into the hollow interior of the skirt. A valve member is movably located in the hollow interior of the skirt and movable between a sealed configuration for preventing fluid flow through the valve and an unsealed configuration for allowing fluid flow through the valve. A retention member extends across at least a portion of the hollow interior of the skirt to prevent the valve member from exiting the hollow interior of the skirt in the unsealed configuration. A base member of the valve is configured to be secured to the bottom surface of the watercraft on the outside of the watercraft and associated with the free end of the skirt. The base member includes an integrally formed plug portion, disk portion, and grip portion.

According to another aspect of the present invention, a method is provided for manufacturing a watercraft having an improved self-bailing function. The method comprises providing a watercraft having a bottom surface and a self-bailing hole extending substantially vertically through the bottom surface. A valve is associated with the self-bailing hole, with the valve including a flange and a valve member. The flange is configured to be secured to the bottom surface of the watercraft on the inside of the watercraft and has an upper face, a lower face, and a central aperture extending between the upper and lower faces. The valve member is positioned within the self-bailing hole and is larger than the central aperture of the valve. The valve member is constrained to only substantially axial movement between a sealed configuration overlaying the central aperture, thereby preventing fluid flow through the self-bailing hole, and an unsealed configuration spaced away from the central aperture, thereby allowing fluid flow through the self-bailing hole. The valve member is configured to alternatively move from the sealed configuration to the unsealed configuration under the influence of gravity and from the unsealed configuration to the sealed configuration under the influence of fluid pressure below the valve member.

BRIEF DESCRIPTION OF THE DRAWINGS

FIG. 1 is a cross-sectional view of a valve according to an aspect of the present invention, with a valve member thereof in a sealed (closed) configuration;

FIG. 2 is a cross-sectional view of the valve of FIG. 1, with the valve member thereof in an unsealed (open) configuration;

FIG. 3 is a cross-sectional view of a flange and skirt of the valve of FIG. 1;

FIG. 4 is a front elevational view of a retention member of the valve of FIG. 1;

FIG. 5 is a bottom plan view of the retention member of FIG. 4;

FIG. 6 is a front elevational view of a base member of the valve of FIG. 1; and FIG. 7 is a bottom plan view of the base member of FIG. 6.

DESCRIPTION OF THE ILLUSTRATED EMBODIMENTS

Figure 1A:
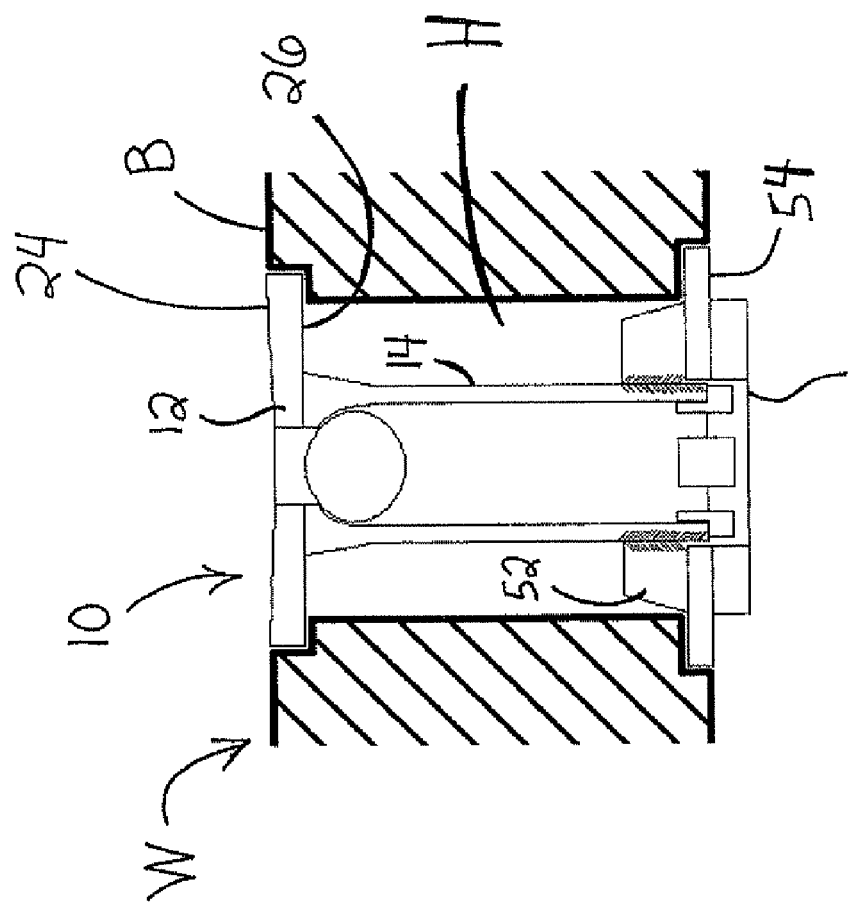
FIG. 1A is a cross-sectional view of the valve of FIG. 1 received in the self-bailing hole of a watercraft.

Although the present invention is described as illustrated in the attached drawings of one possible embodiment, it is to be understood that the illustrated embodiment is merely exemplary of the invention, which may be embodied in various forms. Therefore, specific details disclosed herein are not to be interpreted as limiting, but as a representative basis for teaching one skilled in the art to variously employ the present invention in virtually any appropriate manner.

FIGS. 1 and 2 show a valve 10 comprised of a flange 12, a skirt 14, a valve member 16, a retention member 18; and a valve member 20. FIG. 1 shows the valve 10 in a sealed (closed) configuration, while FIG. 2 shows the valve 10 in an unsealed (open) configuration, which will be described in greater detail herein. The valve 10 is suitable for use in combination with a self-bailing hole extending substantially vertically through a bottom surface of a watercraft. As used herein, the term "vertical" assumes the orientation of a watercraft during normal use in a body of water or (for smaller watercraft) the opposite, upside-down orientation during storage on land. FIG. 1A shows the valve 10 received within such a "vertical" self-bailing hole H. Another exemplary self-bailing hole and watercraft are described in U.S. Pat. No. 5,989,081 entitled "Pedal Boat" to Lekhtman, which is hereby incorporated herein by reference. Of course, the orientation of the watercraft will determine whether or not the self-bailing hole and the valve are strictly vertical, but it will be understood that the term "vertical" refers to the orientation of the self-bailing hole and valve with respect to the watercraft itself, rather than any other frame of reference.

The flange 12, which is also illustrated in FIG. 3, includes a central aperture 22 and may be any shape. However, in the illustrated embodiment, the flange 12 is substantially annular, with a circular perimeter and a circular central aperture 22. The flange 12 has an upper face 24 and a lower face 26 and the central aperture 22 extends between the upper face 24 and the lower face 26.

The flange 12 is adapted to be secured to a portion of the watercraft W to aid in maintaining the valve 10 in place within a self-bailing hole H (FIG. 1A). In one embodiment, the flange 12 is configured to be secured to the bottom surface B of the watercraft W on the inside of the watercraft W. The portion of the bottom surface B of the watercraft W surrounding the top end of the self-bailing hole H may be countersunk to receive the flange 12, thereby causing the upper face 24 of the flange 12 to be substantially flush with the (inside) bottom surface B of the watercraft W, as shown in FIG. 1A.

The skirt 14 extends between a fixed end 28 and a free end 30 (FIG. 3) and may be any shape, provided that it defines a fluid flowpath therethrough and is suitable for being at least partially received in the self-bailing hole H of the watercraft W. The fixed end 28 of the skirt 14 is secured to the lower face 26 of the flange 12, so it may be advantageous to consider the shape of the flange 12 when selecting the shape of the skirt 14. For example, in the illustrated embodiment, the flange 12 is substantially annular and the skirt 14 is generally tubular, with a hollow interior 32. The illustrated skirt 14 has an outer diameter larger than the diameter of the central aperture 22 of the flange 12 and smaller than the diameter of the outer perimeter of the flange 12. The central aperture 22 of the flange 12 opens into the hollow interior 32 of the skirt 14, with the central aperture 22 and the hollow interior 32 being substantially coaxial and in fluid communication with each other.

In the embodiment of FIGS. 1-3, the fixed end 28 of the skirt 14 has a minor opening 34 that is substantially identical to and aligned with the central aperture 22 of the flange 12. The free end 30 of the skirt 14 has a major opening 36 (FIG. 3) that is larger than the central aperture 22 of the flange 12 and the minor opening 34 and, in the illustrated embodiment, aligned with the central aperture 22 and the minor opening 34 and in fluid communication with them.

To transition between the minor opening 34 and the major opening 36, at least a portion of the hollow interior 32 of the skirt 14 may be tapered between the fixed end 28 and the free end 30. In the illustrated embodiment, the skirt 14 comprises a tapered or varying diameter inner portion 38 and an untapered or uniform diameter inner portion 40 (FIG. 3), with the inner tapered portion 38 including the fixed end 28 and the inner untapered portion 40 including the free end 30.

In the embodiment of FIGS. 1-3, the outer surface of the skirt 14 also includes tapered and untapered portions. In the illustrated embodiment, the skirt 14 comprises a tapered or varying diameter outer portion 42 and an untapered or uniform diameter outer portion 44 (FIG. 3), with the outer tapered portion 42 including the fixed end 28 and the outer untapered portion 44 including the free end 30. The skirt 14 is configured to be substantially vertical with respect to the watercraft W when mounted in the self-bailing hole H, as shown in FIG. 1A. A gasket in the nature of an elastomeric ring may be employed with the valve (typically compressed between the lower face 26 of the flange 12 and the bottom surface B of the watercraft W) to further ensure a liquid-tight seal between the valve 10 and the self-bailing hole H and force any water passing through the self-bailing hole H to move through and not around the valve 10, otherwise the function of the valve 10 would be circumvented.

As the skirt 14 is to be secured to the flange 12, it may be advantageous if they are comprised of materials that are reliably joinable. For example, the flange 12 and the skirt 14 may be comprised of a plastic material, in which case they may be secured to each other by known means (e.g., adhesion) or integrally formed with each other (e.g., in a blow-molding process). Other materials, particularly those that are resistant to degradation in water, may also be employed without departing from the scope of the present disclosure.

The valve member 16 (FIGS. 1 and 2) is received in the hollow interior 32 of the skirt 14 and is movable between a sealed configuration (FIG. 1) and an unsealed configuration (FIG. 2). In the illustrated embodiment, the valve member 16 is constrained to only substantially axial (i.e., vertical in the configuration of FIGS. 1 and 2) movement within the hollow interior 32 of the skirt 14. The valve member 16 is moved from the unsealed configuration to the sealed configuration by water (particularly, by fluid pressure below the valve member 16), so it may be advantageous for the valve member 16 to be buoyant in water. In one embodiment, the valve member 16 is hollow and comprised of a plastic material, but other configurations may also be employed without departing from the scope of the present disclosure.

The valve member 16 is larger than the minor opening 34 of the skirt 14 and the central aperture 22 of the flange 12 and, in the sealed configuration (FIG. 1), the valve member 16 overlays the minor opening 34 and the central aperture 22 to block fluid flow through the valve 10. The shape of the valve member 16 depends on the shape of the minor opening 34 and central aperture 22, as the valve member 16 is adapted to seat therewithin to prevent fluid flow through the valve 10. In the illustrated embodiment, the minor opening 34 and central aperture 22 are circular and the valve member 16 is substantially spherical, but other configurations of the minor opening 34, central aperture 22, and valve member 16 may also be employed without departing from the scope of the present disclosure.

In the unsealed configuration (FIG. 2), the valve member 16 is spaced away from the minor opening 34 and central aperture 22, thereby allowing fluid communication between the central aperture 22 of the flange 12 and the hollow interior 32 of the skirt 14. The valve member 16 is smaller than the major opening 36 of the skirt 14, thereby allowing fluid flow through the entire valve 10.

The retention member 18 (shown in greater detail in FIGS. 4 and 5) is adapted to prevent the valve member 16 from exiting the hollow interior 32 of the skirt 14 in the unsealed configuration. This may be accomplished by any of a number of configurations of the retention member 18, but in the illustrated embodiment, the retention member 18 is substantially annular, with a small diameter portion 46 (FIG. 4), a large diameter portion 48 (FIG. 4), and a diametrically extending crossbar 50 (FIG. 5). The small diameter portion 46 is configured to fit within the major opening 36 of the skirt 14, while the large diameter portion 48 is configured to abut the free end 30 of the skirt 14 (FIGS. 1 and 2). The large diameter portion 48 has a smaller diameter than the outer surface of the free end 30 of the skirt 14 to avoid interfering with the connection between the free end 30 and the base member 20, which will be described in greater detail herein. The retention member 18 may be bonded, adhered, or otherwise secured to the free end 30 of the skirt 14 once the valve member 16 is inserted into the hollow interior 32 of the skirt 14.

The base member 20 (shown in greater detail in FIGS. 6 and 7) is configured to be secured to the bottom surface B of the watercraft W on the outside of the watercraft W, as shown in FIG. 1A. The illustrated base member 20 includes an integrally formed plug portion 52 (FIG. 6), disk portion 54 (FIGS. 6 and 7), and grip portion 56 (FIGS. 6 and 7). The base member 20 is connected to the free end 30 of the skirt 14 with the plug portion 52 facing upwardly toward the flange 12 and the grip portion 56 facing downwardly (FIGS. 1 and 2). When secured to the skirt 14, the plug portion 52 is at least partially received within the self-bailing hole H of the watercraft W (FIG. 1A), so it may be frusto-conically shaped (as illustrated) to act like a plug to provide a tight fit between the valve 10 and the self-bailing hole H. The illustrated disk portion 54 is annular, with a diameter that is larger than that of the self-bailing hole H, meaning that it remains outside of the self-bailing hole H and pressed upwardly against the (outside) bottom surface B of the watercraft W (FIG. 1A).

In the illustrated embodiment, the base member 20 includes a central bore 58 with threads 60 that mate with threads 60 on the free end 30 of the skirt 14. When employing such joinder means, the grip portion 56 (which remains outside of the watercraft) can be gripped when rotating the base member 20 to tightly mate the threads 60 of the base member 20 and the skirt 14. With the skirt 14 positioned in the self-bailing hole H and the flange 12 positioned against the (inside) bottom surface B of the watercraft W, tightly securing the base member 20 to the skirt 14 will cause the disk portion 54 and the flange 12 to bear against the bottom surface of the watercraft in opposite directions, thereby maintaining the valve 10 in position with respect to the self-bailing hole. The grip portion 56 may be configured to simplify fastening the valve 10 within the self-bailing hole H. For example, the illustrated grip portion 56 is hexagonal (FIG. 7) to cooperate with a wrench, but other configurations may also be employed depending on the nature of the associated fastening/gripping device.

The top of the self-bailing hole of the watercraft is positioned such that it will be above the waterline when the watercraft is in a body of water, but the remainder of the self-bailing hole (and, hence, the portion of the valve 10 received within the self-bailing hole) will be below the waterline. When the watercraft is stationary in the water, the valve member 16 will be forced (upward) into the sealed configuration (FIG. 1) by water from the body of water. This prevents water ingress into the watercraft via the self-bailing hole. When the fluid pressure below the valve member 16 decreases sufficiently, it will move from the sealed configuration to the unsealed configuration (FIG. 2) under the influence of gravity. Water in the watercraft will exit therefrom via the valve 10, thereby providing an automatic bailing function. During use and/or storage of the watercraft, the valve member 16 may alternatively move between the sealed and unsealed configurations many times, solely under the influences of gravity and fluid pressure, per the foregoing description.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein. For these reasons, the scope of the invention is not limited to the above description but is as set forth in the following claims.

The invention claimed is:

1. A valve for use in combination with a self-bailing hole of a watercraft, the self-bailing hole extending substantially vertically through a bottom surface of the watercraft, the valve comprising:
    a flange configured to be secured to the bottom surface of the watercraft on the inside of the watercraft and having an upper face, a lower face, and a central aperture extending between the upper and lower faces;
    a skirt configured to be at least partially received within the self-bailing hole of the watercraft and extending between a free end and a fixed end to define a hollow interior, the skirt having an outer surface, the outer surface having a first portion with a substantially uniform diameter and a second portion at the fixed end of the skirt, the second portion having a varying diameter tapering outward away from the hollow interior such that the second portion of the outer surface has a greater diameter than the first portion, wherein the fixed end of the skirt is secured to the lower face of the flange, the skirt extending away from the lower face of the flange from the fixed end to the free end, the free end and the flange being at opposite ends of the skirt, the central aperture of the flange opens into the hollow interior of the skirt, the hollow interior having an inwardly tapering diameter at the fixed end;
    a valve member movably located in the hollow interior of the skirt and movable between a sealed configuration for preventing fluid flow through the valve and an unsealed configuration for allowing fluid flow through the valve;
    a retention member extending across at least a portion of the hollow interior of the skirt to prevent the valve member from exiting the hollow interior of the skirt in the unsealed configuration; and
    a base member configured to be secured to the bottom surface of the watercraft on the outside of the watercraft and removably affixed to the free end of the skirt, the base member including an integrally formed plug portion, disk portion, and grip portion, the base member having a central bore, the central bore having a greater diameter than the hollow interior of the skirt.

2. The valve of claim 1, further comprising mating threads along at least a portion of the outer surface of the free end of the skirt and along at least a portion of the central bore of the base member for removably affixing the base member to the free end of the skirt, when affixed to the skirt, the base member surrounding the outside surface of the free end of the skirt wherein the plug portion is outside the hollow interior.

3. The valve of claim 1, wherein the fixed end of the skirt has an opening substantially identical to and aligned with the central aperture of the flange.

4. The valve of claim 1, wherein the flange is substantially annular, the skirt is generally tubular, and the valve member is substantially spherical.

5. The valve of claim 1, wherein the flange and the skirt are comprised of a plastic material.

6. The valve of claim 5, wherein the flange is integrally formed with the skirt.

7. The valve of claim 1, wherein the plug portion of the base member is configured to be at least partially received within the self-bailing hole of the watercraft.

8. The valve of claim 1, wherein the skirt is generally tubular and the valve member is constrained to substantially axial movement within the hollow interior of the skirt.

9. The valve of claim 1, wherein the grip portion of the base member is hexagonal.

10. A watercraft comprising
a surface having a first side and a second side;
a self-bailing hole extending through the surface, the self-bailing hole extending substantially perpendicular between the first and second side; and
a valve comprising
   a flange configured to be secured to the first surface and having an upper face, a lower face, and a central aperture extending between the upper and lower faces;
   a skirt configured to be at least partially received within the self-bailing hole of the watercraft and extending between a free end and a fixed end to define a hollow interior, the skirt having an outer surface, the outer surface having a first portion with a substantially uniform diameter and a second portion at the fixed end of the skirt, the second portion having a varying diameter tapering outward away from the hollow interior such that the second portion of the outer surface has a greater diameter than the first portion, wherein the fixed end of the skirt is secured to the lower face of the flange, the skirt extending away from the lower face of the flange from the fixed end to the free end, the free end and the flange being at opposite ends of the skirt, the central aperture of the flange opens into the hollow interior of the skirt, the hollow interior having an inwardly tapering diameter at the fixed end;
   a valve member movably located in the hollow interior of the skirt and movable between a sealed configuration for preventing fluid flow through the valve and an unsealed configuration for allowing fluid flow through the valve;
   a retention member extending across at least a portion of the hollow interior of the skirt to prevent the valve member from exiting the hollow interior of the skirt in the unsealed configuration; and
   a base member configured to be secured to the second surface of the watercraft and removably affixed to the free end of the skirt, the base member including an integrally formed plug portion, disk portion, and grip portion, the base member having a central bore, the central bore having a greater diameter than the hollow interior of the skirt.

11. The watercraft of claim 10, further comprising mating threads along at least a portion of the outer surface of the free end of the skirt and along at least a portion of the central bore of the base member for removably affixing the base member to the free end of the skirt, when affixed to the skirt, the base member surrounding the outside surface of the free end of the skirt wherein the plug portion is outside the hollow interior.

12. The watercraft of claim 10, wherein the fixed end of the skirt has an opening substantially identical to and aligned with the central aperture of the flange.

13. The watercraft of claim 10, wherein the flange is substantially annular, the skirt is generally tubular, and the valve member is substantially spherical.

14. The watercraft of claim 10, wherein the flange and the skirt are comprised of a plastic material.

15. The watercraft of claim 14 wherein the flange is integrally formed with the skirt.

16. The watercraft of claim 10, wherein the plug portion of the base member is configured to be at least partially received within the self-bailing hole of the watercraft.

17. The watercraft of claim 10, wherein the skirt is generally tubular and the valve member is constrained to substantially axial movement within the hollow interior of the skirt.

18. The watercraft of claim 10, wherein the grip portion of the base member is hexagonal.

* * * * *